United States Patent
Neuman

(10) Patent No.: US 8,643,704 B2
(45) Date of Patent: *Feb. 4, 2014

(54) STEREOSCOPIC IMAGES GENERATED BY ADDING CONTENT TO ALTERNATE EYE IMAGES FOR RETINAL RIVALRY

(75) Inventor: Robert M. Neuman, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/444,089

(22) Filed: Apr. 11, 2012

(65) Prior Publication Data

US 2012/0194653 A1    Aug. 2, 2012

Related U.S. Application Data

(63) Continuation of application No. 12/025,896, filed on Feb. 5, 2008, now Pat. No. 8,208,009.

(51) Int. Cl.
*H04N 15/00* (2006.01)
*H04N 13/02* (2006.01)

(52) U.S. Cl.
USPC .................. 348/50; 348/51; 348/52; 348/59

(58) Field of Classification Search
None
See application file for complete search history.

(56) References Cited

U.S. PATENT DOCUMENTS

| | | | |
|---|---|---|---|
| 4,877,307 A | 10/1989 | Kalmanash | |
| 5,825,539 A | 10/1998 | Hoshi | |
| 6,417,880 B1 | 7/2002 | Uomori et al. | |
| 6,819,489 B2 | 11/2004 | Harris | |
| 6,956,964 B2 | 10/2005 | Lee et al. | |
| 6,977,629 B2 | 12/2005 | Weitbruch et al. | |
| 7,027,222 B2 | 4/2006 | Takahashi et al. | |
| 7,091,929 B2 | 8/2006 | Bronson | |
| 7,545,405 B2* | 6/2009 | Provitola | 348/42 |
| 8,194,119 B2* | 6/2012 | Ramstad | 348/51 |
| 2005/0041159 A1* | 2/2005 | Nakamura et al. | 348/722 |
| 2006/0098282 A1* | 5/2006 | McCart et al. | 359/472 |
| 2006/0158730 A1* | 7/2006 | Kira | 359/462 |

* cited by examiner

*Primary Examiner* — Mohamed Ibrahim
(74) *Attorney, Agent, or Firm* — Marsh Fischmann & Breyfogle, LLP; Kent A. Lembke

(57) ABSTRACT

A method for generating stereoscopic images with retinal rivalry effects. The method includes retrieving primary eye images and alternate eye images from memory. These images are filmed from horizontally offset cameras but include the same content. The method continues with processing the alternate eye images to introduce retinal rivalry such as by including a set of frames that have differing content from a corresponding set of frames from the primary eye images. The differing content, for example, may include an object rendered for the alternate eye that was not rendered in the primary eye images. The method may further include editing the primary eye images by inserting a transition and then editing the alternate eye images to perform the transition (e.g., a dissolve or cut) at a temporally offset transition point such as several frames later to introduce frames that differ in content from one eye stream to the other.

18 Claims, 6 Drawing Sheets

STEREOSCOPIC IMAGES GENERATED BY ADDING CONTENT TO ALTERNATE EYE IMAGES FOR RETINAL RIVALRY

RELATED APPLICATION

This application is a continuation of U.S. patent application Ser. No. 12/025,896, filed. Feb. 5, 2008, which is incorporated by reference herein in its entirety.

BACKGROUND OF THE INVENTION

1. Field of the Invention

The present invention relates, in general, to stereoscopic image generation, and, more particularly, to systems and methods for producing stereoscopic images for three-dimensional (3D) projection or display, with at least a portion of the images being generated to provide unique or special effects such as at scene transitions.

2. Relevant Background

There is a growing trend toward using 3D projection techniques in theatres and in home entertainment systems including video games and computer-based displays. Using 3D projection techniques the right eye and the left eye images can be delivered separately to display the same scene or images from separate perspectives so that a viewer sees a three dimensional composite, e.g., certain characters or objects appear nearer than the screen and others appear farther away than the screen. Stereoscopy, stereoscopic imaging, and 3D imaging are labels for any technique capable of recording 3D visual information or creating the illusion of depth in an image. The illusion of depth in a photograph, movie, or other two-dimensional image is created by presenting a slightly different image to each eye. Traditional stereoscopic photography creates a 3D illusion starting from a pair of 2D images. In most live action and animated 3D projection systems, depth perception in the brain is achieved by providing to the eyes of the viewer two different images, representing two perspectives of the same object, with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames with one or more object slightly offset to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic view is the use of anaglyph. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles. In other 3D projection systems, the viewer may be provided glasses with appropriate polarizing filters such that the alternating right-left eye images are seen with the appropriate eye based on the displayed stereoscopic images having appropriate polarization (two images are superimposed on a screen, such as a silver screen to preserve polarization, through orthogonal polarizing filters). Other devices have been produced in which the images are provided to the viewer concurrently with a right eye image stream provided to the right eye and a left eye image stream provided to the left eye. Still other devices produce an auto-stereoscopic display via stereoscopic conversion from an input color image and a disparity map, which typically has been created based on offset right and left eye images. While these display or projection systems may differ, each typically requires a stereographic image as input in which a left eye image and a slightly offset right eye image of a single scene from offset cameras or differing perspectives are provided to create a presentation with the appearance of depth.

With the recent growing surge in development and sale of 3D projection systems and devices, there is an increased demand for new and exciting content. For example, there is a demand for films, video games, and other 3D works that include imagery that provides high quality 3D effects but also provides other unique and surprising effects. As a result, there remains a need for improved ways to generate stereoscopic images for use with existing as well as future 3D projection systems.

SUMMARY OF THE INVENTION

The present invention addresses the above problems by providing methods and systems for generating stereoscopic images to create special effects or inserted artifacts. In the stereoscopic images, the alternate eye (such as the right eye) image includes differing content (e.g., a temporal difference or added/deleted content) rather than including identical content filmed or imaged from an offset camera as in conventional stereoscopic image generation. For example, rather than sending the left and right images of the same shot or scene, the left and right eight images are manipulated in one or more ways to take advantage of the natural ability of human's to integrate or fuse images received from their eyes even though they may differ. In this manner, retinal rivalry is intentionally created, at least for a short time or over a particular set of frames, to generate an effect or to insert a particular, desired artifact (or content unique to an image displayed to one eye).

Manipulation in the methods and systems of the invention may include rendering an animated shot or scene for the right eye that includes one or more additional elements (or that removes one or more objects or elements) that were not rendered for the corresponding shot or scene for the left eye. The additional element(s) may be included for a limited number of frames of the scene such as for less than a few seconds (or 24 to 60 frames) and, in some cases, a fraction of a second (or less than about 16 frames such as 1 to 8 frames or the like). When projected with a 3D projection or display system, the result is a special effect such as a transparent effect when the differing content of the frames of the shot or scene are integrated by a viewer. A wide range of effects are possible and will be apparent to those skilled in the stereoscopic arts such as manipulating colors, saturation, hue, shape, and other content (or content characteristics). The method of creating stereoscopic images may be implemented during the editing process. For example, a transition between shots or scenes may be used to create retinal rivalry by delaying the transition for one of the two image streams, such as by creating a phase difference for a cut or fade from one shot to the next for one of the eyes, and forcing the viewer to binocularly fuse two disparate images. Such retinal rivalry creates a unique effect in the stereoscopic images created with the paired eye image streams.

More particularly, a computer-based method is provided for generating a stereoscopic image with introduced retinal rivalry or retinal rivalry-based effects. The method includes operating a processor or CPU to retrieve a set of primary eye images and a set of alternate eye images from memory. These images are filmed from different (e.g., horizontally offset) camera positions but generally include the same or substantially similar content. For example, frames in one image set will correspond in time to the frames of the other image set with the same content being viewed from a differing perspective. The method continues with operating the processor to edit the alternate eye images so as to introduce a retinal rivalry effect. After the editing, the alternate eye images typically will include at least one set of frames that have different content from a corresponding (e.g., in time or along a time line) set of frames from the primary eye images, with the differing content generating the retinal rivalry effect for a viewer. The differing content, for example, may include an object rendered in the edited/substituted set of frames that was not rendered or included in the primary eye images.

The method may further include editing the primary eye images by performing or inserting a transition at a transition point from a frame with first content to a second frame with second, differing content. The editing of the alternate eye images then includes performing the transition at a temporally offset transition point (such as an offset of less than about 2 seconds in some cases or less than about 24 frames). The method may further include generating stereoscopic images from the primary eye images and edited alternate eye images and then displaying the stereoscopic images on a 3D capable display device. In this manner, a 3D image is viewable with the introduced retinal rivalry effect (such as by a viewer observing a silver or other screen and wearing 3D glasses such as glasses with appropriate polarizing filters in the left and right eye lenses).

According to another aspect, embodiments of the invention may be implemented in software or code devices provided in computer readable medium operable to generate a retinal rivalry effect in stereoscopic images. The software may cause a computer to retrieve a set of frames corresponding to a left eye view of images or image content and a set of frames corresponding to a right eye view of the same images or image content. The software may further cause the computer to edit the left eye set of frames to include a transition at a first transition point and to edit the right eye set of frames to include a similar transition (e.g., a cut, a fade, a wipe, or the like) but at a second transition point that is offset from the first transition point such as by at least one frame (and, typically, less than several seconds worth of frames such as less than about 60 frames and often less than about 16 frames such as 1 to 8 frames or the like depending on the particular effect associated with the retinal rivalry).

The edited left and right eye frames are stored in memory, are used to generate stereoscopic images, and the stereoscopic images are displayed on 3D capable display devices. The software may also cause the computer to render a subset of the right eye set of frames in a manner that they include additional or differing content (such as an additional object/element or an object or element with differing characteristics such as differing shape, color, saturation, hue, position, or the like). The computer may then replace the subset of right eye set of frames with the rendered frames with the added/differing content. The transition provided by the editing may be a transition from a first frame to a second, temporally-offset frame with differing content.

DETAILED DESCRIPTION OF THE PREFERRED EMBODIMENTS

Figure 1:
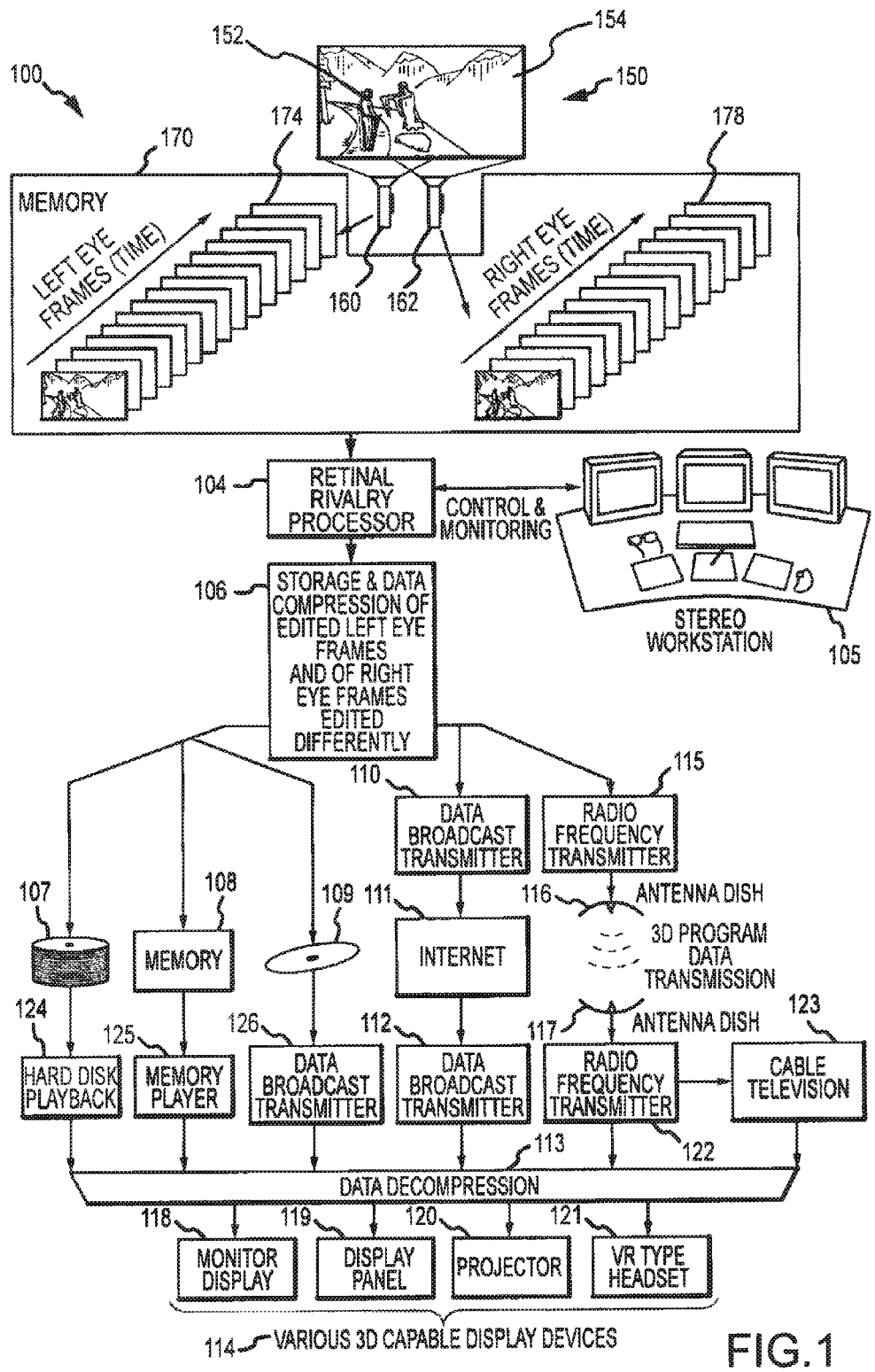
FIG. 1 is an embodiment of a stereoscopic image generation and distribution system showing use of a retinal rivalry module or processor to produce images or frames for one eye that are edited differently, such as by delaying a scene transition, than the images or frames for the other eye to produce desired effects or intentionally introduced artifacts for brief periods in a film or image stream.

Briefly, embodiments of the present invention are directed to methods and systems for generating left and right eye images (or frames) that are used as stereoscopic images (such as by projection via a polarizing filter or the like) in a 3D projection or display system. A period of retinal rivalry is provided in the stereoscopic images by including one or more sets of images or frames in at least one of the left and right eye images that differs in content from the corresponding images or frames from the other eye images (e.g., corresponding temporally to create a 3D effect).

In one implementation, stereoscopic images with periods of retinal rivalry are created by temporally delaying or offsetting transition points between shots or between scenes in the two eye image streams. Throughout the years, the 2D cinema has developed a wide variety of shot and/or scene transitions that are used to create the sequential montage of shots that forms the basis of the grammar of film and similar animated works. The transitions range from the simplest or "cut" to "opticals" that include the fade or dissolve as well as a wide variety of wipes and other more complex transitions (and, "transitions" and "transition points" are intended to refer to nearly any transition or change to a differing scene or shot). When the grammar of the film language is extended to the 3D cinema, shot transitions have historically been translated to mean treating both the left and right eye image streams in the same manner temporally such as by inserting a transition point at the same point in the timeline of the images or frames to achieve a transition such as a cut or fade. In contrast, implementations of the invention may involve intentionally creating a phase difference between the left eye and right eye transitions (such as for up to 24 or more frames which corresponds to up to 1 or more seconds delay when the frames are later displayed at 24 fps). When displayed or projected as stereoscopic images, this creates a period of retinal rivalry and a desired effect such as by shooting each shot in similar form such as to convey a different meaning, to impart a surreal feeling to the viewer, to cause the Viewer a foreboding sensation or feeling or unease, or to otherwise impart sensations to the viewer who is forced to binocularly fuse two content-disparate images.

The process of generating or creating left and right eye image pairs or image streams with periods of retinal rivalry will typically be implemented through the use of a computerized workstation with associated software, hardware, and memory for storing source images (e.g., primary and alternate eye images or left and right eye images), images in process (e.g., images from editing processes entering differing shot/scene transition points or rendering/providing frames with differing content), and resulting image streams. Further, the primary and alternate eye images may be used in combination to provide stereographic images that may be stored, transmitted, and/or displayed or projected using digital communication networks, compression techniques, and any of a number of conventional 3D-capable display/projection devices. Hence, before discussing specific implementations of processes implementing the retinal rivalry introduction techniques, it may be useful to describe representative networks, computer systems, storage devices, software, and other tools useful for implementing embodiments of the invention.

FIG. 1 illustrates a representative stereoscopic image generation and distribution system 100 that may be used by an animator, stereo film, producer, or the like to produce left and right images or frames of an image stream with unique effects. The system 100 includes content 150 with mobile objects 152 (such as characters) and immobile or stationary objects 154. The content 150 is filmed or imaged with a pair of cameras 160, 162, which may be real or actual cameras when the content 150 is provided by a set 154 and live actors 152 or may be animation cameras when the content 150 is rendered or animated content with rendered drawings 154 and/or models 152. The captured content from the cameras 160, 162 is stored (or digitized and stored in some live action implementations) in memory 170. As shown, the content is stored as a plurality or set of frames or images 174 arranged in a time order for the left eye (i.e., left eye images or a left eye image stream) and a plurality or set of frames or images 178 for the right eye (i.e., right eye images or a right eye image stream). Typically, upon initial data or content capture the number of frames are equal in each set 174, 178 and are arranged in the same time order, e.g., a frame in set 174 will correspond to a paired or corresponding frame in set 178 such that a similar content 150 is shot or imaged at a particular point in time but from a differing perspective or position of cameras 160, 162. If no further processing is performed, the left eye frames 174 and right eye frames 178 would make up a conventional image stream for use in creating stereoscopic images (e.g., would not contain retinal rivalry as called for in the inventive methods and systems).

To introduce retinal rivalry and produce special effects, the system 100 includes a retinal rivalry processor 104 (e.g., one or more processors or CPUs running graphics and other software/algorithms described herein). The retinal rivalry processor 104 functions to process the input frames or images 174, 178 in memory 170 such that the frames 174 or 178 are modified to include frames or sets of frames with differing content such as by delaying a transition point in one set 174, 178 or by substituting a set of frames in one set 174, 178 that has differing content 150 (such as differing background/immobile objects 154 or an object or character 152 that is added or removed). The specific algorithms implemented by the processor 104 are described in detail below. Control and monitoring of the operation of the processor 104 is performed via a stereo workstation 105 and may include a user (e.g., an animator or stereo producer) operating or interacting with 3D graphics or CG image system that may implement a retinal rivalry module, a rendering engine (e.g., when it is desired to render substitute frames with differing content), an editing module, and/or other film processing tools such as may be used in live action productions or animated work productions. In the illustrated exemplary system 100, the processor 104 is implemented and controlled by a user working at a conversion workstation 105 at which the user may access an interactive user interface and image processing tools and may, in some embodiments, control and monitor the results of the processor 104 (e.g., as it runs to select and adjust transition points and/or selecting objects to include in substitute frames for one of the image sets 174, 178). It should be understood that the functions implemented during the processor 104 may be performed by one or more processors/controllers. Moreover, these functions can be implemented employing a combination of software, hardware and/or firmware taking into consideration the particular requirements, desired performance levels, and the like for a given system or application.

The workstation 105 may include multiple monitors, three-dimensional glasses, and one or more user input mechanisms such as a keyboard, a mouse or trackball, drawing tablet(s), and a drawing pen. The workstation 105 may also include a processor that provides signals to the monitors, controls the visual displays at these monitors, and receives and processes user inputs provided to the system via the user input mechanisms, e.g., controls the interactive interface or the like. The processor may provide, in conjunction with the three-dimensional glasses, when the glasses are synchronized to a signal from the processor, a three-dimensional image at an application monitor, which is updated to allow the user to observe changes in the depth or placement of various objects within the composited alternate eye image. In some embodiments, an object selection monitor may be employed to display the primary eye or source images to allow selection and/or isolation of objects or elements within the displayed images. The processor/controller 104 (or CG image system 210 in FIG. 2) is programmed to allow the user to enter differing transition points for a particular transition in the two frame sets 174, 178, to allow a user to choose objects to render in a set of frames that are then substituted into one of the frame sets 174, 178, and/or to otherwise generate retinal rivalry for subsets of the frames 174, 178 (or for short time periods or durations) such as by adjusting content by changing colors, hues, saturations, shapes, or other content in one of the frame sets or image streams 174, 178 for a subset of the frames or images.

The primary eye images and the alternate eye images (e.g., the modified or edited product) and their associated working files may be stored via storage and data compression 106 performed by processor 104. The images or files may be stored on hard disk, on tape, or on any other form of data storage. In the interest of conserving space on the above-mentioned storage, the digital data of the images may be compressed otherwise file sizes can become large especially when dealing with a fall-length animated work or digitized live action film. Data compression also may be desired when the information passes through a system with limited bandwidth, such as a broadcast transmission channel.

The primary and alternate eye images (or stereoscopic images) 174, 178 after editing/processing by retinal rivalry processor 104 and/or workstation 105 can be stored in many forms. The image data can be stored on a hard disk 107 such as for hard disk playback 124, in removable or non-removable memory 108 such as for use by a memory player 125, or on removable disks 109 such as for use by a removable disk player 126, which may include but is not limited to digital versatile disk (DVD) players. The primary and alternate eye images (or stereoscopic images) can also be compressed into the bandwidth necessary to be transmitted by a data broadcast receiver 110 across the Internet ill or other digital communications network, and then received by a data broadcast receiver 112 and decompressed (e.g., via data decompression 113), making it available for use via 3D-capable display devices 114.

Similar to broadcasting over the Internet 111, the primary and alternate eye images (or stereoscopic images) created by the methods described herein can be transmitted by way of electromagnetic or RF (radio frequency) transmission by a radio frequency transmitter 115. This includes direct conventional television transmission as well as satellite transmission employing an antenna dish 116. The images can also be transmitted by satellite and received by an antenna dish 117, decompressed, and viewed on a monitor display 118, possibly incorporating a cathode ray tube (CRT), a display panel 119 such as a plasma display panel (PDP) or a liquid crystal display (LCD), a front or rear projector 120 in the home, industry, or in the cinema, or a virtual reality (VR) headset 121. If the stereoscopic images are broadcast by way of RF transmission, the receiver 122 feeds a display device directly.

Another use for the stereoscopic images produced by the inventive processes is distribution via cable television 123.

As will be understood from this description, the methods provide multiple uses of retinal rivalry to create desired effects or added artifacts. Retinal rivalry or binocular rivalry may take many forms and this description is intended to include any form that is created by selectively altering the content of two paired stereoscopic images rather than merely showing the same content or image from a different camera angle or viewing perspective. Retinal rivalry generally is the phenomenon of visual perception in which perception alternates between different images (or images with differing content) presented to each eye. The effects obtained by practicing the invention may be stereopsis or a result near stereopsis when the content differences are relatively small or minor between the left eye image and the right eye image (such as at the first frame after a fade transition when one of the eye image streams does not begin the fade). In other cases, the effects or results may be more significant such as when one eye image stream is transitioned to a new shot or scene by a cut and the other is not or when an object is added or inserted as differing content in one of the image streams. The rivalry may be created by changing or modifying one streams content in the form of shapes or contours (binocular contour rivalry), colors (binocular color rivalry), lightness or brightness (binocular luster), added objects (contour dominance, flash suppression, or other rivalry), or other content or content characteristics. The result may be a fusion of the objects/content shown in the primary and alternative eye views or superimposition in some cases. With an understanding of the methods described herein, it is likely that many desirable effects may be produced by selectively introducing retinal rivalry into stereoscopic images, and these are all considered within the breadth of this description and the following claims.

Figure 2:
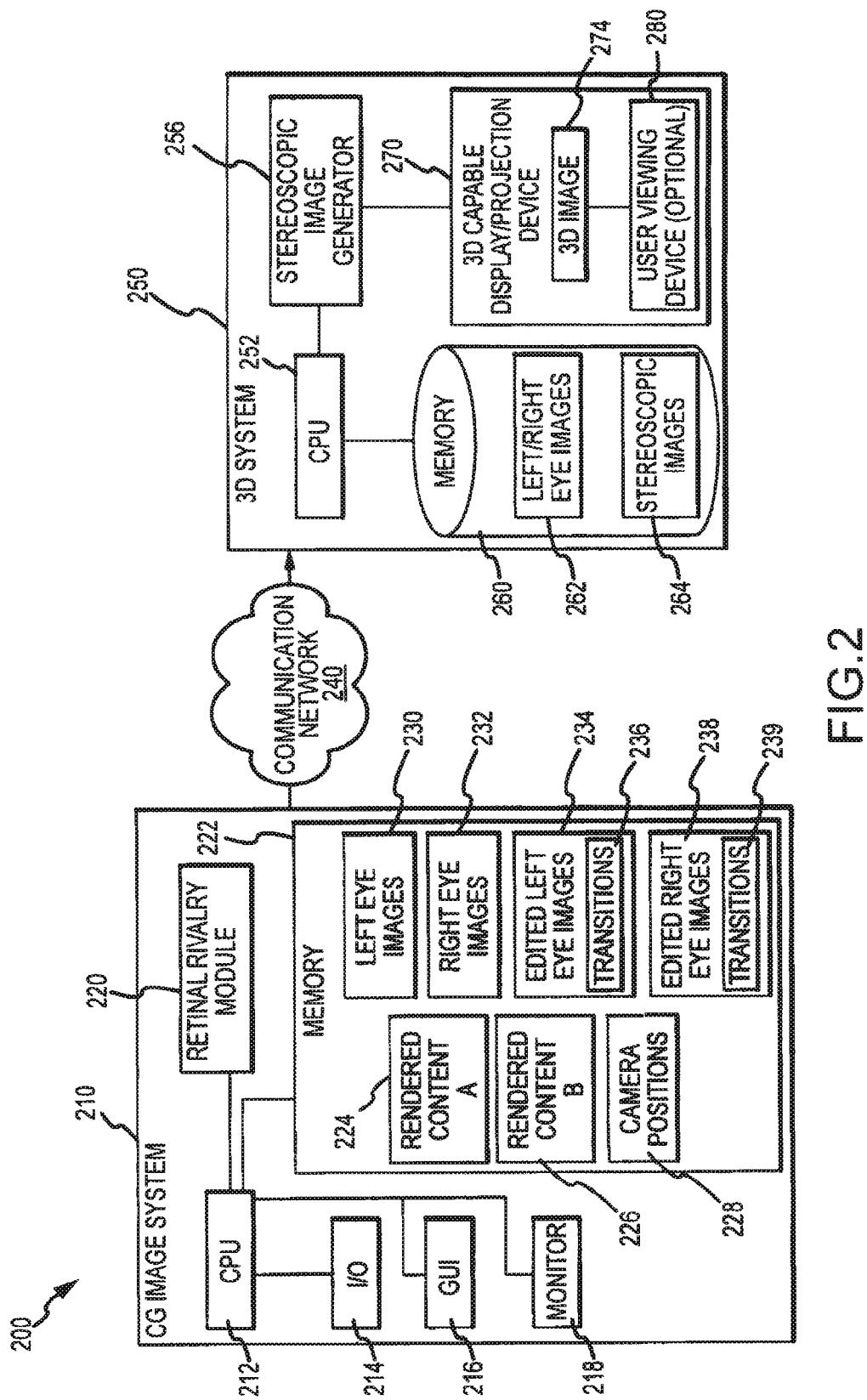
FIG. 2 is a functional block diagram of a system for producing primary and alternate eye images including special effects provided by retinal rivalry and for generating and displaying stereoscopic images to a viewer or audience.

FIG. 2 illustrates a functional block diagram of a retinal rivalry-based stereoscopic system 200 of one embodiment of the invention. As shown, the system 200 includes a computer generated (CG) image system 210, such as a typical computer system/network running software/firmware implementing the processes of the present invention. The CG image system 210 is linked to a digital communications network 240, such as the Internet, a local area network, a wide area network, or the like, to communicate or transfer generated left and right eye images with retinal rivalry portions to a 3D generation/projection system 250 for display to a viewer. The CG image system 210 includes a CPU 212 controlling one or more I/O devices 214, a GUI 216, and a monitor 218 such as to allow a user (e.g., animator, editor, or the like) to view frames or images captured with primary and alternate eye cameras, to select edit or transition points, and to input transition delays to create retinal rivalry effects. A retinal rivalry module 220 is run or implemented by CPU 212 that in some cases provides all or portions of the GUI 216 and/or acts to process user input such as transition points, substitute frames for one eye image stream to add or delete objects (or create some asymmetry between a set of frames in the left/right eye images streams), and display select frames/images on the monitor 218 to allow the user to view the resulting special effect. The module 220 may also be implemented by performing modifications of other editing and/or CG graphics software such as to implement the processes described herein (such as the method 600 shown in FIG. 6).

The CG image system 210 includes memory 222 (which may also be provided separately such as via network 240). The memory 222 stored rendered content 224, 226 such as a number of images or frames of an animated film or work with background and foreground content that may be relatively stationary or fixed as well as objects such as characters that may be animated or move among the frames. The rendered content 224 differs from that of the rendered content 226, and this content difference, such as frames with an additional object (e.g., character) or differing content is used as discussed below to produce retinal rivalry by the module 220. The memory 222 also stores positions of primary and alternate eye cameras including offsets and whether the cameras are parallel or positioned with toe in and other parameters. The camera positions 228 are used to image or film the rendered content 224 and/or 226 to produce left eye images 230 and right eye images 230, 232 (or primary and alternate eye images).

In some embodiments, the left eye images 230 and right eye images 232 are both formed from first rendered content 224 (or content 226). The differing locations 228 provide a differing perspective of the same content such that the images 230, 232 may be transferred over network 240 for use by the 3D system 250 in producing conventional stereoscopic images. In contrast, one of the eye images 230 or 232 may be imaged from the first rendered content 224 while the other eye images 232 or 230 may be imaged from the second rendered content 226 that includes at least some differing content to produce retinal rivalry between the images 230, 232 such as for discrete periods of times or sets of frames numbering from 1 to 60 or more frames.

For example, rendered content 226 may be identical to content 224 except for one or more special effect sets of frames or images in which an asymmetry such as an additional object/element is presented, an object/element is removed, a shape is altered, a color/saturation/hue is modified, or other differing content is introduced. Alternatively, the rendered content 226 may comprise small sets of rendered content that can be substituted for a like number of frames in the left or right eye images 230, 232 to introduce rivalry (e.g., rendered content 226 may include 1 to 24 or more frames with an added or deleted object that is rendered in the content 224 and imaged with the proper camera position 228 for the images 230 or 232 to allow these frames to be used as substitute frames to achieve a desired effect).

In other cases, the retinal rivalry module 220 is used via I/O 214, GUI 216, and/or monitor 218 to create edited left eye images 234 and edited right eye images 238 from the left and right eye images 230, 232, which may be taken from either or both content 224, 226. For example, the left eye images 230 may be generated by imaging rendered content 224 from a first camera position 228 and right eye images 232 may be generated by imaging the same rendered content 224 from a second, offset camera position 228. Edited left eye images 234 may be created by inserting one or more transitions 236, such as cuts, fades, wipes, and other conventional film transitions used in CG of animated works, at particular points along the timeline associated with the set of frames/images 230 (e.g., between two frames in the set 230).

To create a retinal rivalry effect, the edited right eye images 238 are created by inserting or applying transitions 239 that are typically similar in type (e.g., if the first transition 236 in images 234 is a fade, the first transition 239 is also a fade, but this is not a required limitation of the inventive method) but that differ in their timing or insertion point in the timeline. In other words, one or more of the transitions 239 is temporally offset from the corresponding transitions 236 of the other eye image stream 234. The offset may be defined by an amount of time such as up to 1 to 2 seconds or more before or after the transitions 236 or in number of frames such as 1 to 8 or greater delay. This results in the edited left eye images 234 differing in content for at least one set of frames or images from the edited right eye images 238, and the result is retinal rivalry when these frames of differing content (not just differing perspectives or views of the same content) are shown to the left and right eyes of a viewer.

The edited images 234, 238 may then be transferred by storage on media and transfer of that media to a 3D system 250 or, as shown, via network 240. The 3D system 250 includes a CPU 252 that stores the received images 262 in memory 262. The 3D system 250 operates a stereoscopic image generator 256 to process the images 262 (as and if necessary) to form stereoscopic images 264 for display/projection as 3D images 274 with a 3D capable display/projection device 270. For example, the generator 256 may apply a particular polarization or colorization to the images 262 to form the stereoscopic images 264 such that a viewer may view the 3D images 274 by use of correctly polarized glasses or other viewing devices 280. As discussed above, the left and right eye images 262 are presented to the viewer such that the viewer is able to see or view the left eye images with their left eye and see or view the right eye images with their right eye (e.g., in rapidly alternating or switching manner or concurrently). The use of the left/right eye images 262 that include retinal rivalry portions or sets of frames creates a desired special effect or introduced artifact in the 3D image 274.

Figure 3:
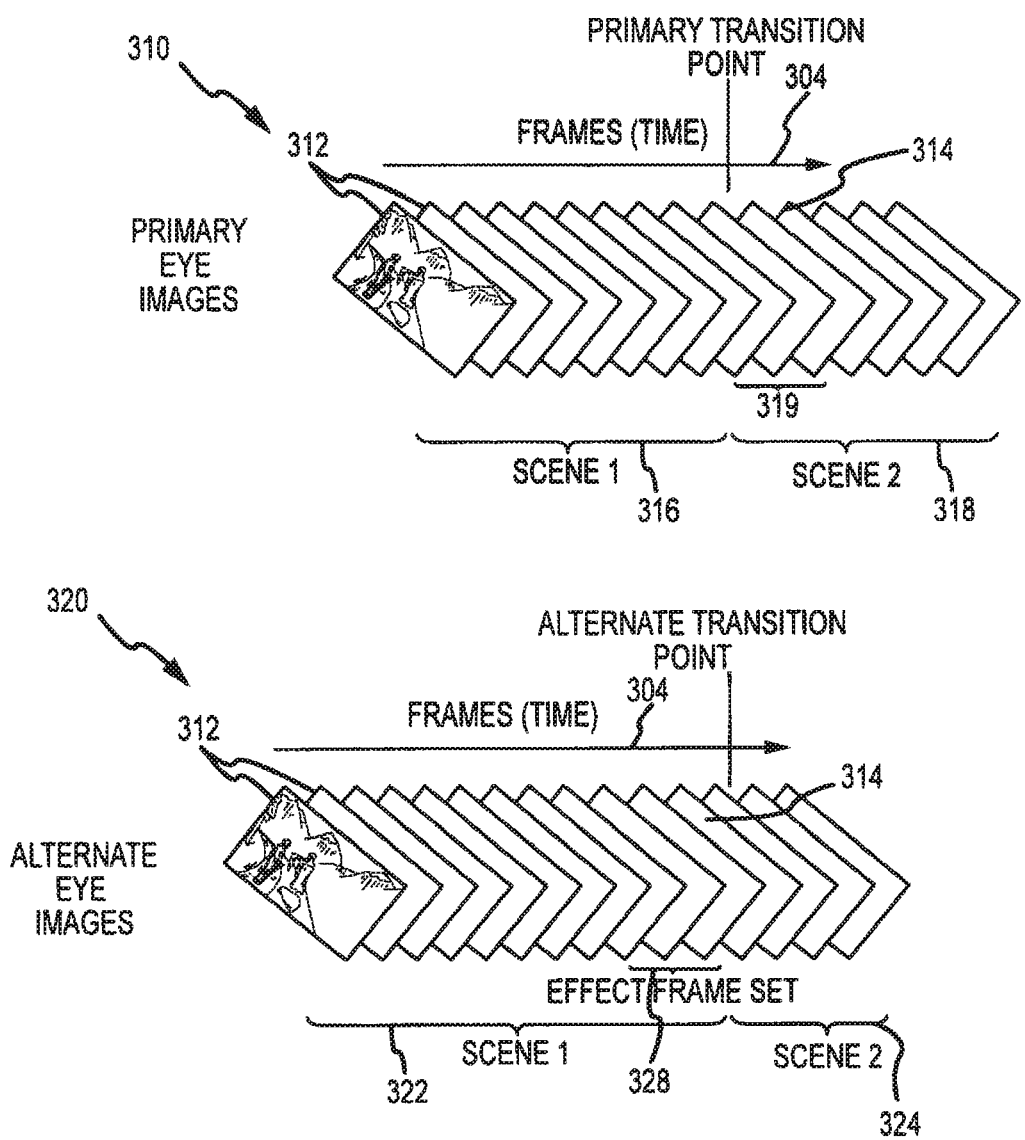
FIG. 3 illustrates primary and alternate eye images (e.g., left and right eye images or vice versa) according to one embodiment in which a transition has been delayed or temporally moved in the set of alternate eye images to create retinal rivalry and a corresponding effect when the images are used to form stereoscopic images.

FIG. 3 illustrates an exemplary process of introducing retinal rivalry into stereoscopic images. As shown, a plurality of primary eye images 310 and alternate eye images 320 are provided such as CG images stored in a data storage device or digitized or other frames of a live action movie, which have been shot or filmed using a pair of offset cameras. The images 310, 320 generally include the same content in the included frames or images 312 that are arranged in a time-related manner or sequence along a time line 304 (e.g., animation may be created by showing the frames 312 sequentially as arranged along the time line 304 such as at 24 to 30 fps or to another convention or desired frame rate). The primary eye images (e.g., the left eye images) 310 have been edited such that they include a set of frames 316 associated with a first shot or a first scene and a second set of frames 318 associated with a second shot or a second scene. There is a primary transition point placed at a particular time on the time line 314 where a transition (such as a cut, fade, or the like) is performed in the primary eye image stream 310 from the first to the second scene (or shot). As a result, the second scene or shot begins with a set of frames 319 of the larger set of frames 318.

To affect retinal rivalry, the alternate eye image stream 320 is edited differently such that the first scene or shot includes a differing set of frames 322 that include additional frames 328 than the set of frames 316 of first scene or shot 316 of the primary eye image stream 310. This is achieved by delaying the alternate transition point between the first scene 322 and the second scene or shot 324 as compared with the primary transition point on time line 304. This delay may be set as a particular time period or as a number of frames. In the illustrated case of FIG. 3, the alternate transition point is three frames (i.e., the effect frame set 328), and the second scene begins with frame 314, which is included in both image streams 310, 320. A retinal rivalry is developed because while the primary eye images 310 include frames 319 to start the second shot or scene the alternate eye images 320 include an effect frame set 328 (or continue with frames from the first shot or set, in this case). The frames 319 and frames 328 include at least some differing content such as a differing character or character position, a different object shape or position, a different background, foreground, or other element, differing color, hue, saturation, or the like, or other differing content. The second shots or scenes 318, 324, after this delay, again have the same content (but at a differing camera position) at frame 314. The use of 3 frames (e.g., frames 319 and 328) for the rivalry is exemplary but not limiting, but it is recognized that the period of rivalry typically will be kept relatively short such as less than seconds and more typically a fraction of a second such as less than about 12 frames when the rate is 24 to 30 fps.

Figure 4:
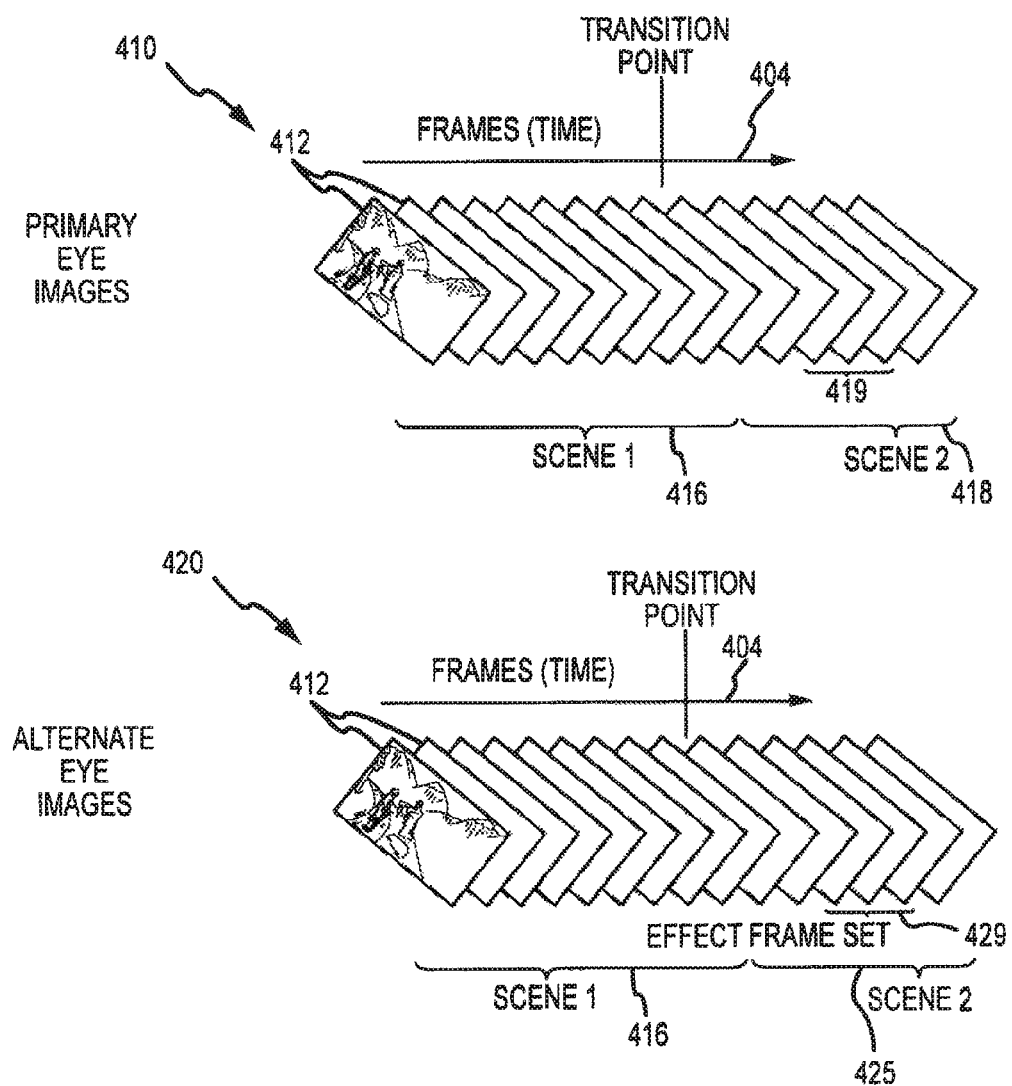
FIG. 4 illustrates primary and alternate eye images according to another embodiment in which the alternate eye images include a set of frames or images that differ from those in the primary eye set, e.g., include or exclude an object, have a different color, saturation, or hue, have a differing shape for a shared object, or the like, to create retinal rivalry when the images are used to form stereoscopic images.

FIG. 4 illustrates another exemplary process for creating retinal rivalry in stereoscopic images. As shown, a plurality of primary eye images 410 and alternate eye images 420 are provided such as in a location in a data store. The images 410, 420 may generally include a number of frames 412 with content that is similar but for being shot or imaged from a differing camera position. Hence, the frames 416 of a first shot or scene may be shown along a time line 404 to create a depth effect by including horizontal offsets between the frames 416 of the two image streams 410, 420 but including the same content in the frames 416 of the two streams 410, 420. A transition may be placed at a shared transition point on time line 404 to transition (e.g., cut, wipe, fade, or the like) to a second shot or scene.

To create retinal rivalry, the frames 418 of the second shot or scene in the primary eye images 410 include a subset 419 with a particular or first content. In contrast, the frames 425 of the second shot or scene in the alternate eye images 420 include a subset 429 with at least some differing content from the subset 419. For example, a number of frames (such as the three frames shown in FIG. 4 or another number of frames) may be rendered or shot with a similar background, foreground, and other elements but with an additional object such as an additional character or with one or more removed or deleted objects such as removing a character or an object. In contrast, other content such as an object's shape, position, or color/saturation/hue or the like may me modified to differ in the frames 429 when compared with the frames 419.

This introduced artifact or asymmetry is preferably of a degree or amount that the viewer's brain cannot simply ignore the differences but must struggle or deal with the differences to create a desired effect such as seeing both sets of content, fusing the two together, feeling an emotion such as unease, foreboding, or the like, or other effects. The differing-content frames 429 are substituted for the original content frames 419 in the alternate eye images 420 to create retinal rivalry (note, the substitution could take place in either or both streams 410, 420 such as a first occurrence in one stream and the next occurrence in the other stream and so on). In some embodiments, retinal rivalry is created using the processes shown in FIGS. 3 and 4 in a single set of stereoscopic images and may be performed with the same or a different set of images or frames (e.g., the transition point technique may be used at one point in the image streams and the substituted content technique may be used at a second point or the same point).

The above examples illustrate the creation of retinal rivalry at shot transitions to produce a desired effect. Embodiments may also or alternatively include processes and systems where retinal rivalry is intentionally introduced within the boundaries of a shot, not just at the shot transitions (or such transition may be excluded in these applications). For example, a time-warping effect is applied to one eyes image stream but not to that of the alternate eye (or, alternatively, is applied to both but differently).

For example we could have the following pair of stereoscopic image streams. The left stream may include: Frame 1, Frame 2, Frame 3, Frame 4, Frame 5, Frame 6, Frame 7, Frame 8, Frame 9, Frame 10, Frame 11, Frame 12, Frame 13, Frame 14, Frame 15, and the right stream may include: Frame 1, Frame 2, Frame 3, Frame 4, Frame 5, Frame 6, Frame 7, Frame 8, Frame 9, Frame 10, Frame 11, Frame 12, Frame 13, Frame 14, Frame 15. But, after time-warping the right eye stream, the left stream may include: Frame 1, Frame 2, Frame 3, Frame 4, Frame 5, Frame 6, Frame 7, Frame 8, Frame 9, Frame 10, Frame 11, Frame 12, Frame 13, Frame 14, Frame 15 while the right stream may include: Frame 1, Frame 2, Frame 3, Frame 3, Frame 4, Frame 5, Frame 7, Frame 8, Frame 9, Frame 10, Frame 12, Frame 13, Frame 14, Frame 15, Frame 15. In this manner, within the shot boundaries, periods of time are created when the two image streams become temporally offset, which results in retinal rivalry and introduces a visual effect to the resulting animation or image streams.

Figure 5:
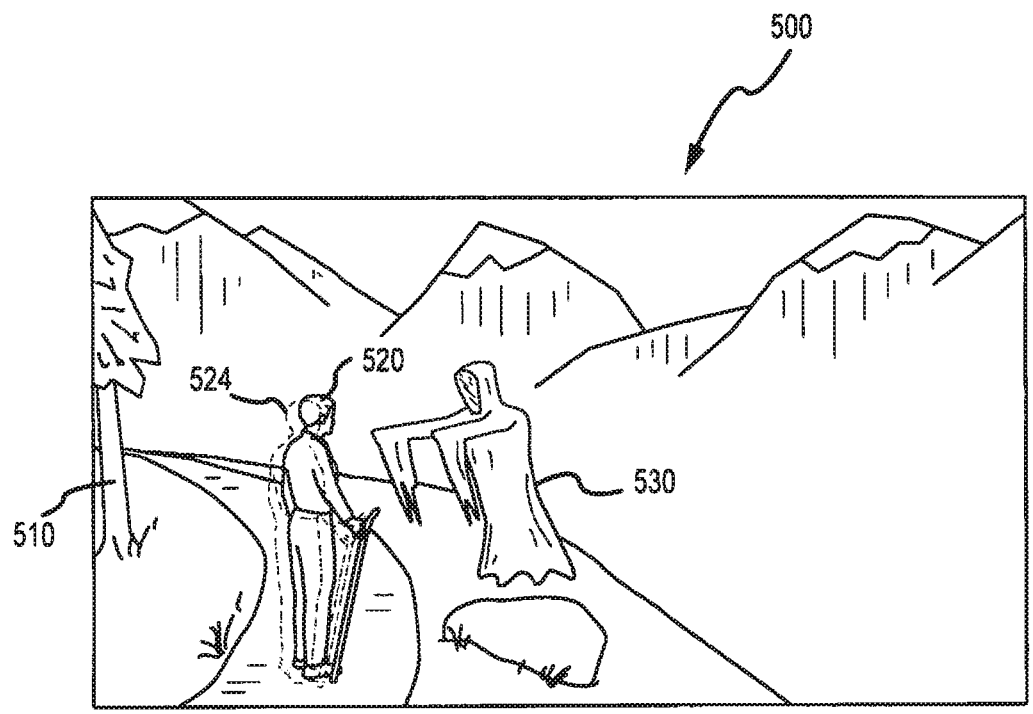
FIG. 5 illustrates a relatively simple 3D image that may be displayed or projected using retinal rivalry techniques described herein to obtain an alternate (or primary) eye image set that differs temporarily and/or in content with the primary (or alternate) eye image set.

FIG. 5 illustrates in simplistic form a 3D image 500 as it may be experienced or viewed by a viewer, e.g., by wearing a headset or 3D glasses or using other display techniques. The 3D image 500 is intended to represent the display of primary eye image along with an alternate eye image that have been paired to create retinal rivalry according to the present inventive concepts. As shown, the primary or left eye image may be shot or imaged from a camera so as to have content including background objects or elements such as tree 510. The alternate or right eye image is shot or imaged from an offset camera to include an object or element 520 (e.g., a character) that is being faded out as from the primary eye image or frame as shown with dashed lines 524. For example, a transition point corresponding to a fade between shots or scenes is delayed at least the illustrated one frame for the alternate eye image stream. In the same illustrate stereoscopic image (or image pair) 500, the alternate eye image or frame has been rendered or shot to include additional content not included in the primary eye image or frame. Specifically, additional character 530 is included that may be experienced as a solid character or as a transparent character depending upon a parameters such as how it is included, its color/saturation/hue, and the number of frames for which the viewer is shown the additional character (i.e., additional or added content). In this frame 500, multiple retinal rivalry techniques are used, but, in other implementations, it may be desirable to perform only one retinal rivalry technique at a time (or limit the number of differences in content to a degree determined experimentally to obtain a desired effect while still providing an enjoyable experience for viewers).

Figure 6:
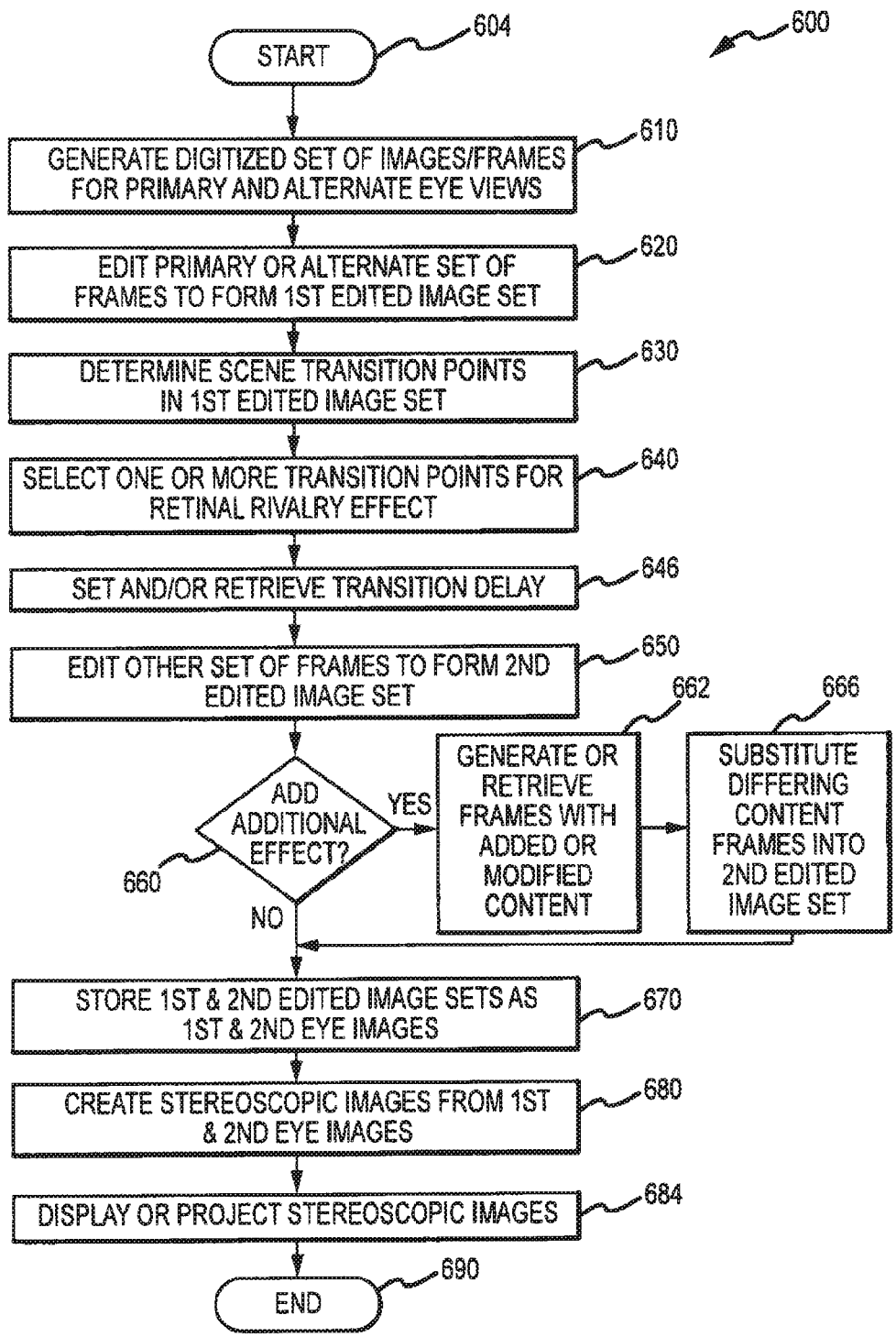
FIG. 6 is a flow chart of a method of generating a stereo pair or right/left eye pair of images for display of stereoscopic images with a special effect provided by use of intentionally-included retinal rivalry.

FIG. 6 illustrates a method 600 for creating and displaying stereoscopic images with retinal rivalry portions that are used to create effects. The method 600 typically is implemented in a computer system or network such as, but not limited to, those shown. In FIGS. 1 and 2, and, in some cases, all or portions of the method 600 may be implemented with software or program code devices stored in memory or on magnetic media devices that is then access or read by a computer processor to cause the computer to perform one or more of the steps of the method 600.

As shown, the method 600 starts at 604 such as by loading appropriate editing, user interface, and other software (such as 3D graphics applications) onto a workstation or computer system. Step 604 may also include planning a desired effect and selecting a time or point in a storyline for the effect to occur such as at one or more transition points or when a desired mood or effect is desired to heighten a user's experience (e.g., a sense of unease may be created by adding or removing content from one of the image streams and such unease or other created or reinforced feeling or sensation may work well at a particular point in a story). At 610, the method 600 continues with generating a digitized set of images/ frames for the primary and alternate eye views such as by imaging a rendered number of images or frames with two offset cameras in the CG environment or by concurrently filming a live action work with stereo cameras and then, if necessary, digitizing the live work.

Step 620 involves editing one of the image streams to produce a desired image stream for use as stereoscopic images. Specifically, the primary (or alternate) eye images or set of frames from step 610 are edited to produce a desired image stream for the primary eye (such as the left eye), and this first edited image set typically includes one or more transitions such as a cut, fade, or the like provided at a particular point in time or after a particular frame in the original image set. At 630, the method 600 continues with determining or retrieving the transition points in the first edited image set such as may correspond to transitions between particular shots or between scenes of the film or work. At 640, one or more of these transition points are selected for use in initiating a retinal rivalry-based effect (but, in some cases, zero points may be chosen and the effect may be created with substituted frames with differing content as described below).

At 646, the transition delay is set for each of the selected transitions or a default is retrieved from memory. The delay may be set temporally or based on a timed delay or may be chosen to be a number of frames (such as a number from 1 to 60 or more frames). At 650, the method 600 continues with editing the other set of frames (e.g., the alternate eye images or the image stream or frames associated with the right eye view) to create the second edited image set. The editing includes delaying the transition (or temporally offsetting the transition (e.g., providing a temporal offset between the two, corresponding transitions) which may mean performing the transition earlier in the stream) such that at least for a portion of the frames in the two image streams there is differing content and not merely an offset camera position (such as a dissolve or other transition to a new shot being delayed by several to many frames or for up to a 2 or more seconds).

At 660, the method 600 continues with determining whether additional effects are desired in the stereoscopic images. If yes, the method 600 includes at 662 the generating or retrieving from memory of frames or images with added or modified content. This may include rendering differing content in a particular set of frames for the alternate eye image stream, and then at 666, these differing content frames are substituted for a like number of frames in the second edited image set (or, in some cases, in the first edited image set). As a result of steps 662 and 666 stereoscopic images formed from the two edited image sets include a set of paired or stereo images that differ in content and create retinal rivalry based on this asymmetry in content (which may take place apart from a transition point or coincide with such a transition such as by having the substituted frames being the last few frames of a shot or scene or the first few frames of a new shot or scene The method 600 proceeds at 670 with storing the first and second edited image sets as primary and alternate (or left and right) eye images or image streams (or such storage in memory can occur throughout the process 600). At 680, the method 600 involves creating stereoscopic images from these stored primary and alternate eye images such as by applying a particular polarization or colorization (or displaying through a filter that provides polarization or colorization). Alternatively, a disparity map may be created at 680 based on the images sets of step 670 such as when the display technique involves an auto-stereoscopic or stereogram system in which displays are created by the display/projection equipment based on a primary or color image stream and a provided disparity map. At 684, the method 600 includes displaying or projecting the stereoscopic images created bases on the first and second edited image sets, and a viewer experiences retinal rivalry in at least one portion of the displayed image stream, which provides a desired effect or viewing experience. The method 600 then ends at 690 (or certain steps may be repeated to change the effect and create new stereo image pairs).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the embodiments described in detail generally teach modifying content of one eye stream such as the alternate eye stream, which may be the right or left eye image stream. However, the methods may also include modifying the images in either image stream to create retinal rivalry such as by temporally delaying a shot or scene transition in the right eye image stream at least once and then later delaying a shot or scene transition in the left eye image stream (or otherwise modifying both streams in differing ways to achieve one or more desired effects or introduced artifacts).

The invention describes techniques for creating retinal rivalry by manipulating content in images or frames in one or both eye image streams or images. These methods may be used in nearly any computer generated (CG) animation or computer graphics system with varying software, hardware, and firmware arrangements, and the methods are also generally useful with live action films such as by implementation during the editing of the frames shot with offset or stereo cameras to delay a transition in one eye image stream or the like. Further, numerous 3D projection systems and techniques may be used to create, display/project, and view stereoscopic images formed based on the left and right (or primary and alternate) eye images or image streams of the invention. For example, these systems may use side-by-side techniques (e.g., head-mounted displays), 3D glasses (e.g., liquid crystal shutter glasses, linearly polarized glasses, circularly polarized glasses, compensating anaglyph glasses, or the like), autostereogram techniques, and other 3D projection and viewing equipment such as film projectors and digital projectors (such as CRT, DLP, LCD, and the like).

The invention claimed is:

1. A computer-based method for generating stereoscopic images with introduced retinal rivalry-based effects, comprising:
   operating a processor to retrieve from memory a set of primary eye images and a set of alternate eye images including substantially similar content imaged from differing camera positions; and
   operating the processor to process the alternate eye images to introduce a retinal rivalry effect, wherein after the processing, the alternate eye images comprise at least one set of frames including differing content than a corresponding set of frames in the primary eye images, wherein the differing content comprises a rendered object, whereby additional content is introduced to the alternate eye images, and wherein the additional content including the rendered object is not included in the corresponding set of frames in the primary eye images.

2. The method of claim 1, further comprising operating the processor to edit the primary eye images to perform a transition at a transition point from a first frame with first content to a second frame with second content.

3. The method of claim 2, wherein the second operating of the processor to process the alternate eye images comprises performing the transition at an alternate transition point that is temporally offset from the transition point.

4. The method of claim 1, wherein the processing of the alternate eye images comprises substituting the at least one set of frames with the rendered object for a like number of frames in the alternate eye images.

5. The method of claim 1, wherein the temporal offset is less than about 2 seconds.

6. The method of claim 1, wherein the temporal offset is selected such that the at least one set of frames with the differing content includes less than about 24 frames.

7. The method of claim 1, further comprising third and fourth operating the processor to generate stereoscopic images from the primary eye images and the processed alternate eye images and to display the stereoscopic images on a 3D capable device, whereby a 3D image is viewable with the retinal rivalry effect.

8. A non-transitory computer readable storage medium for generating a retinal rivalry effect in stereoscopic images, comprising:
  computer readable code configured to cause a computer to retrieve a set of frames corresponding to a primary eye view of image content and a set of frames corresponding to an alternate eye view of the image content;
  computer readable code configured to cause the computer to render a subset of alternate eye set of frames with added content; and
  computer readable code configured to cause the computer to replace the subset of alternate eye set of frames with the rendered frames with the added content, wherein the added content comprises at least one of an additional object, an object removed from only the alternate eye set of frames, a differently shaped object, a modified saturation level, and an object in a differing location relative to a location of the object in the alternate eye set of frames.

9. The computer readable storage medium of claim 8, further comprising:
  computer readable code configured to cause the computer to edit the primary eye set of frames to include a transition at a first transition point;
  computer readable code configured to cause the computer to store in memory the edited primary and alternate eye sets of frames;
  computer readable code configured to cause the computer to generate stereoscopic images from the edited primary and alternate eye sets of frames; and
  computer readable code configured to cause the computer to display the stereoscopic images on a 3D capable display device.

10. The computer readable storage medium of claim 9, wherein the offset is less than about 16 frames.

11. The computer readable storage medium of claim 9, wherein the transition comprises a transition from a first frame to a second, temporally-offset frame with differing content.

12. The computer readable storage medium of claim 8, wherein the added content comprises an additional rendered object.

13. A method for creating a retinal rivalry-based effect, comprising:
  in a data structure, storing a digitized set of images for display to a first eye of the viewer, the first eye images comprising frames of a first content; and
  with a computer processor, processing the first eye images to generate a digitized set of images for display to a second eye of the viewer, the second eye images comprising frames corresponding to a portion of the first content and a set of frames containing a second content that at least partially differs from corresponding ones of the first content frames of the first eye images, whereby a retinal rivalry effect is created when the set of frames of the second content are displayed on the 3D capable display device,
  wherein the second content differs from the first content by including added content comprising at least one of an additional object, a removed object, a differently shaped object, a modified saturation level, and an object in a differing location.

14. The method of claim 13, wherein the first eye images comprise a transition at a point between two of the frames of the first content and wherein the right eye images comprise the transition point at a point between two of the frames of the second content that is temporally offset from the transition point in the left eye images.

15. The method of claim 14, wherein the offset is less than about 60 frames.

16. The method of claim 14, wherein the offset is less than about 2 seconds.

17. The method of claim 14, wherein the second content differs from the first content in the frames provided in the temporal offset between the transition in the left and right eye images.

18. The method of claim 13, wherein the first and second content comprises computer generated objects, and the second content differs from the first content in the frames by including at least one additional one of the computer generated objects than presented in the first content in the frames in the first eye images.

* * * * *